Nov. 15, 1955  K. M. CASTOR  2,723,511
GRINDING FIXTURE FOR CIRCULAR CUTTING TOOLS
Filed Feb. 17, 1954
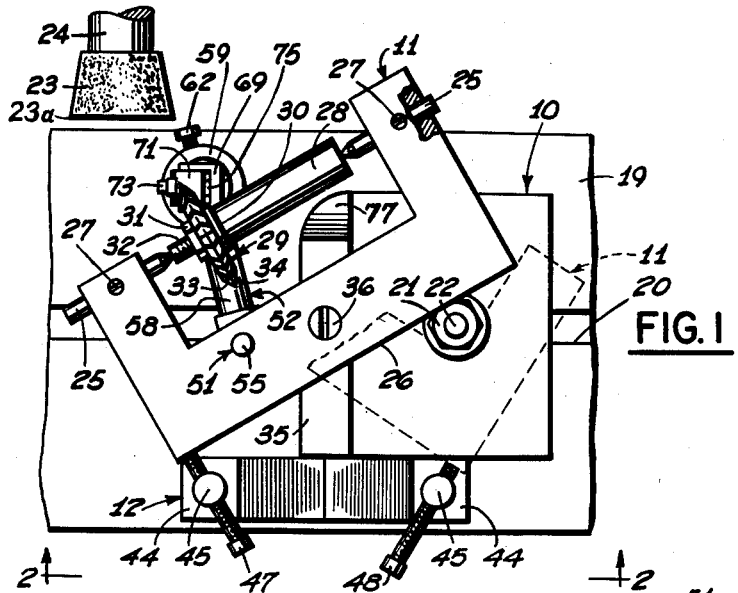
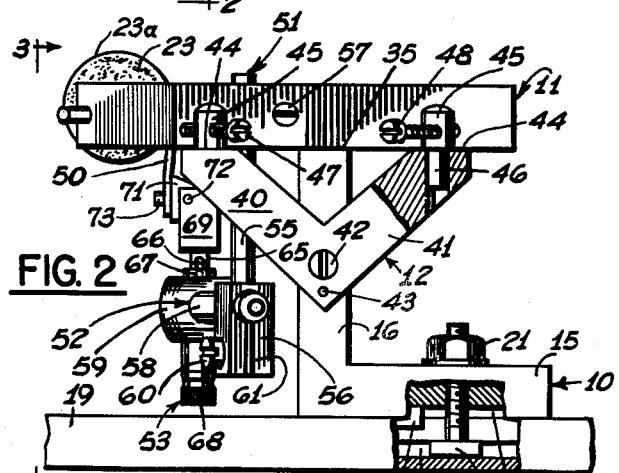
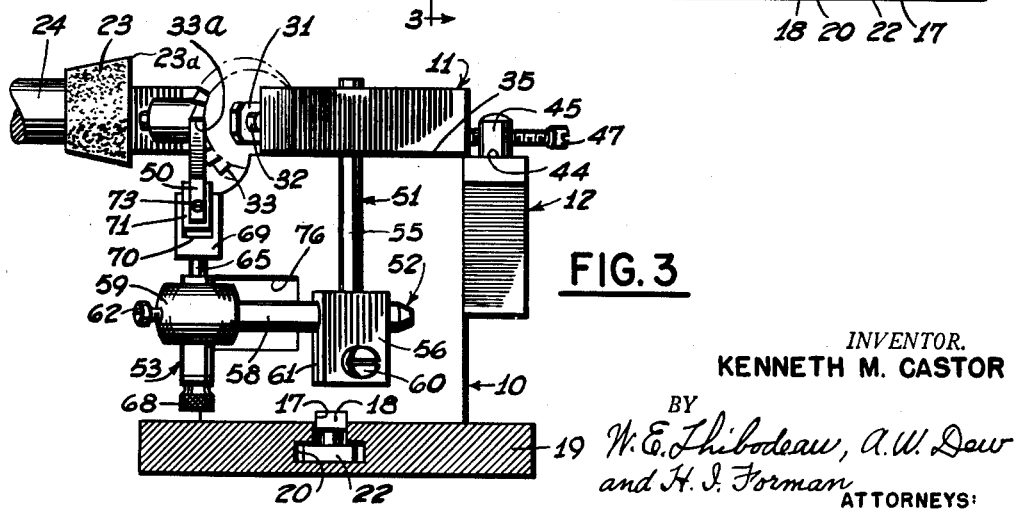
INVENTOR.
KENNETH M. CASTOR
BY
W. E. Thibodeau, A. W. Dew
and H. J. Forman
ATTORNEYS ём
United States Patent Office 2,723,511
Patented Nov. 15, 1955

2,723,511

GRINDING FIXTURE FOR CIRCULAR CUTTING TOOLS

Kenneth M. Castor, Philadelphia, Pa.

Application February 17, 1954, Serial No. 411,034

1 Claim. (Cl. 51—225)

(Granted under Title 35, U. S. Code (1952), sec. 266)

The invention described herein may be manufactured and used by or for the Government for governmental purposes without the payment of any royalty thereon.

My invention relates broadly to grinding machine attachments. In particular, although not limited solely thereto, it relates to a fixture attachable to a grinding machine for the purpose of positioning a circular cutting tool in proper relationship to the grinding machine's abrasive wheel so that each of the tool's cutting edges may be quickly and accurately ground.

As those skilled in the art already know, circular cutting tools are, essentially, disc-shaped and are provided with a plurality of circumferentially located teeth, each of which is provided with a cutting edge. Circular cutting tools, for convenience, may be considered as comprising two general types: plain and angular.

In some circular cutting tools of the plain type, each cutting edge may be parallel to the tool's axis, as in a circular saw; in others, each cutting edge may be perpendicular to the tool's axis, as in a facing cutter. In still other circular cutting tools of the plain type, each cutting edge may consist of two portions: one portion parallel to the tool's axis, the other portion perpendicular to the tool's axis, as in shoulder cutters. In yet other plain type circular cutting tools, each cutting edge may consist of three portions: one portion parallel to the tool's axis and two portions perpendicular to the tool's axis, as in tools for cutting a flat bottomed groove.

In some circular cutting tools of the angular type, each cutting edge may comprise two portions: one portion perpendicular to the tool's axis, and the other portion disposed in angular relationship, other than perpendicular, to the tool's axis, as in a dove-tail cutter. In other circular cutting tools of this type, each cutting edge may comprise two portions, both of which are disposed angularly, other than perpendicular, relative to the tool's axis, as in cutters for forming a V-shaped groove.

Although my fixture can be employed with equal facility in the grinding of circular cutting tools of both types, it is especially applicable with reference to grinding tools of the angular type. For that reason, I have chosen to describe my fixture and to explain its use in connection with grinding one representative form of angular cutting tool. It is believed that such explanation will be sufficient to embrace all features of my invention and to render obvious the understanding of the fixture's use in grinding other circular cutting tools.

The grinding of circular cutting tools, especially those for use on metallic and other like materials, requires great precision in order that the cutting load will be properly distributed on each of the cutting edges. In the past, many ways have been provided to sharpen circular cutting tools but these ways, for the most part, have necessitated the use of costly, special purpose grinding machines which required operation by highly skilled artisans. By contrast with these factors, my grinding fixture can be attached to the table of a simple, comparatively inexpensive, surface grinder, or similar machine, commonly found in the ordinary machine shop and usually operated by semi-skilled or unskilled labor.

In essence, my fixture comprises a yoke in which two axially aligned centers are arranged in spaced relationship. Mounted for selective rotation between the centers is a mandrel upon which the circular cutting tool to be ground is mounted. The yoke is attached for pivotal movement to an angular base plate so that, when the base plate is attached to the table of the grinder, the yoke rests in a plane parallel to the surface of the table and is adjustably positionable relative to the base plate. This adjustment permits the axis of the cutting tool to be placed in the proper angular relationship to the axis of the grinder's abrasive wheel so that each of the tool's cutting edges can be ground successively.

Setting the axis of the cutting tool with reference to the axis of the abrasive wheel is facilitated by a V-shaped yoke positioning bar which is attached to the angular base plate. This positioning bar is provided with two adjusting screws, each of which is located in the path of the yoke's pivotal movement thereby to limit the yoke's pivotal movement relative to the angular base plate.

Finally, in order to prevent the cutting tool from being rotated as it is being ground, I have provided a resilient finger which is adjustably positionable in three dimensions. This finger, although preventing the cutting tool from being rotated by the abrasive wheel, does allow the cutting tool to be rotatably indexed relative to the abrasive wheel so that each of the tool's cutting edges can be ground one at a time.

One object of my invention is to simplify the procedure for grinding circular cutting tools.

Another object is to eliminate the necessity for expensive, special purpose grinding machines for grinding such cutting tools.

Still another object is to eliminate the need for highly skilled operators to perform the grinding operation.

A further object is to provide a fixture attachable to the work table of a simple, comparatively inexpensive grinding machine, for grinding circular cutting tools.

The foregoing and other objects and advantages of my invention will become apparent from an inspection of the following description and the accompanying drawings wherein my fixture, for illustrative purposes only, is employed in grinding a circular cutting tool of the angular type specifically an angular cutting tool for forming a V-shaped groove in a workpiece. In the drawings:

Fig. 1 is a plan view of my fixture in which a representative circular cutting tool is mounted for grinding. The fixture is shown attached to the table of a simple grinding machine and placed in position, relative to the machine's abrasive wheel, for grinding one portion of each of the tool's multiple cutting edges. That portion of the fixture partially shown in broken line indicates that part of the fixture is movable to another position, relative to the machine's abrasive wheel, for grinding the remaining portions of each of the tool's cutting edges.

Fig. 2 is a side view, partly broken away and partly sectioned, taken along line 2—2 of Fig. 1 and showing other details of my fixture.

Fig. 3 is an end view taken along line 3—3 of Fig. 2 and showing further details of the fixture.

In order to facilitate the comprehension of my invention and the appreciation of the inventive novelty residing therein, the various components of my fixture will be introduced and the essential details of those components will be described. Subsequently, a suggested procedure for preparing my fixture for use in grinding the illustrated cutting tool and then the manner of operation will be described.

As shown in Figs. 1 to 3, the main structural components of my fixture are: the angular base plate 10, the yoke 11, and the yoke positioning bar 12. The essential details of those components follow.

Angular base plate

Angular base plate 10, as shown in Fig. 2, is L-shaped, having the legs 15 and 16. These legs, as there shown, are substantially perpendicular to each other. Leg 15 is provided with the groove 17 (also see Fig. 3) in which the key 18 (see Figs. 2 and 3) is secured in any convenient manner (not shown). As also shown in those figures, the angular base plate rests upon the table 19 of a common, inexpensive grinder (not shown) with the base plate's key engaging the T-slot 20 formed in the grinder's table. This engagement, naturally, prevents the base plate from rotative movement relative to the table. The base plate is held firmly against the table by means of the nut 21 (see Figs. 1 and 2) which threads onto the T-bolt 22, one end of which is accommodated in the T-slot in the usual manner (see Figs. 2 and 3) and the other end of which extends through an accommodating opening in the plate's leg 15 (see Fig. 2).

Also forming part of the grinding machine (not shown) is the representative abrasive wheel 23 (see Figs. 1 to 3) which is mounted in usual fashion (also not shown) on the rotatable spindle 24 (see Figs. 1 and 3). In many grinding machines, the axis of the spindle, and therefore the axis of the abrasive wheel mounted thereon, may be inclined relative to the table (as viewed in Fig. 1); but, for convenience, this axis is represented in that figure, and also in Figs. 2 and 3, as being substantially perpendicular to the table. For the particular grinding application illustrated herein, the abrasive wheel is shown as frusto-conical in shape. The base peripheral edge 23a is, in this case, employed as the operative face for the grinding operation.

Yoke

Yoke 11, as shown in Fig. 1, is somewhat C-shaped and is provided with the spaced, coaxial centers 25. The common axis of these centers is parallel to a side 26 of the yoke and also parallel to table's upper surface (i. e., that surface in Figs. 2 and 3 which is toward the top of the drawing sheet). As shown in Fig. 1, one center is accommodated in each end of the yoke where it is adjustably positionable axially relative to the yoke. After positioning in the yoke, each center can be secured in place by means of its respective set screw 27.

Rotatably supported by and between the yoke's centers is the mandrel 28 upon which the circular cutting tool 29 to be ground is mounted (see Figs. 1 and 3). The cutting tool, having an axial opening (not shown) therethrough fits slidably over a portion of the mandrel and abuts the shoulder 30 (see Fig. 1) against which it is secured by means of the nut 31 (see Figs. 1 and 3). This nut fits onto the threaded portion 32 of the mandrel.

For illustrative purposes, the circular cutting tool represented in Figs. 1 and 3 is of the angular type in which the two portions of each cutting edge are inclined toward each other and in which each portion of each cutting edge is also inclined a substantially equal amount relative to the tool's axis. For ease of later description, one portion of each cutting edge on one side of the tool will be identified by the reference character 33 (see Figs. 1 and 3) and the other portion of each cutting edge on the opposite side of the tool by the reference character 34 (see Fig. 1). Note, in Fig. 3, that the cutting tool, for convenience of later explanation, has been placed on the mandrel so that rotation of the tool in a counter-clockwise direction about its own axis would perform a cutting operation during actual use of the tool.

In Figs. 1 to 3, it can be seen that yoke 11 rests atop the end surface 35 of the angular base plate's leg 15 where it is secured for pivotal movement relative to the base plate by means of the screw 36 (see Fig. 1). This pivotal movement of the yoke, as earlier mentioned, is provided in order that the axis of mandrel 28, and therefore the axis of the cutting tool mounted thereon, may be placed in the desired angular relationship to the axis of the machine's abrasive wheel 23 so that the tool's cutting edges may later be ground.

In the present instance, where each cutting edge comprises the two portions earlier mentioned, yoke 11 preferably must be capable of being placed in two positions relative to the base plate. These positions are best shown in Fig. 1 in which the yoke is shown in one position by solid line, and is partially shown in the other position by broken line. When the yoke is in the solid line position the portions 33 of all cutting edges can be ground; and, when the yoke is in the broken line position, the portions 34 of all cutting edges can be ground. As the description of my novel fixture proceeds, however, it will also be shown how both portions of the tool's cutting edges can be ground with the yoke in but one position.

Yoke positioning bar

Yoke positioning bar 12, as shown in Fig. 2, is a V-shaped member having the legs 40 and 41. By means of the screw 42 and the pin 43 (also see Fig. 2), this bar is secured, near its apex, to one side of the angular base plate's leg 16 so that the bar's coplanar, end surfaces 44 are substantially flush with the angular base plate's surface 35 (see Figs. 2 and 3). This arrangement allows yoke 11 to be pivotally movable relative to angular base plate 10 without interference from the yoke positioning bar.

In each of the yoke positioning bar's end surfaces 44 is the stud 45 (see Figs. 1 to 3). Each stud has the shank portion 46 (see Fig. 2) which is accommodated, frictionally tight, in the yoke positioning bar. As also shown in Figs. 1 and 2 one stud is provided with the adjusting screw 47 and the other stud is similarly provided with the adjusting screw 48. These screws, as will later be explained, facilitate the positioning of yoke 11 relative to the base plate 10 so as to place the axis of the cutting tool in the desired angular relationship to the axis of the abrasive wheel and also prevent that relationship from being disturbed during the grinding operation.

It will be evident from Fig. 1, that adjusting screw 47 limits pivotal movement of yoke 11 in a counter-clockwise direction about screw 36, and that adjusting screw 48 limits the yoke's pivotal movement in a clockwise direction. From these statements it is obvious that adjusting screws 47 and 48 can be so set that, with the yoke in the position shown in full line in Fig. 1, one portion 33 of each of the tool's cutting edges can be placed parallel to the axis of abrasive wheel 23 as the tool is rotated; and with the yoke in the position partially shown in broken line, the other portion 34 each of the tool's cutting edges can be placed parallel to the abrasive wheel's axis as the tool is rotated.

In order to prevent the cutting tool from being rotated by contact with the abrasive wheel during the grinding operation so that the corresponding portion of each cutting edge can be ground one at a time, and, further, to enable the tool readily to be indexed rotatably from one cutting edge to the next, my fixture is provided with the resilient finger 50 (see Figs. 2 and 3). Associated with this finger are the bar 51 (see Figs. 1 to 3), the arm 52 (see Figs. 1 to 3), and the barrel 53 (see Figs. 2 and 3). The essential details of these parts follow.

Bar 51 has the cylindrical portion 55 (see Figs. 1 to 3) at one end of which is the clamp block 56 (see Figs. 2 and 3). The bar's cylindrical portion is accommodated in an opening in yoke 11 (see Fig. 1) with the cylindrical portion extending substantially perpendicularly from the yoke toward the machine's table 19. Clamp block 56, therefore, is disposed between the yoke and the table. For a purpose which will become evident later, bar 51 is adjustably positionable, both axially and rotatably relative to the yoke. After being placed in the desired position, the bar can be secured in place by means of set screw 57 (see Fig. 2).

Arm 52 has the cylindrical portion 58 at one end of which is the enlarged portion 59 (see Figs. 1 to 3). As best shown in Figs. 2 and 3, the arm's cylindrical portion is accommodated in an opening in the bar's clamp block 56 so that the axis of the arm's cylindrical portion is substantially perpendicular to the axis of the bar's cylindrical portion. Arm 52, similarly to bar 51, is also adjustably positionable both axially and rotatably. After being placed in the desired position, as will also be explained later in connection with the preparation of the fixture for use, the arm can be secured in place by means of the clamp screw 60 (see Figs. 2 and 3). This screw, when tightened, draws together portions of the clamp block which are separated in usual fashion by the cleft 61 (see Figs. 2 and 3) so as to grip the arm, thereby holding it in position; but when the screw is loosened, allows those portions of the clamp block to release their grip on the arm's cylindrical portion so that the arm can be positioned where desired.

Barrel 53 (see Figs. 2 and 3) is a tubular member open at each end. As there shown, this barrel is accommodated in the arm's enlarged portion 59 with the barrel's axis substantially perpendicular to the axis of arm 52, and is adjustably positionable both axially and rotatably therein. After proper positioning, as will be explained later, the barrel can be secured in place by means of the clamp screw 62 (see Figs. 1 and 3).

Slidably accommodated for axial movement in barrel 53 is the stem 65 (see Figs. 2 and 3). This stem is provided with the axially extending slot 66, part of which is shown in Fig. 2. This stem, however, is not rotatable relative to the barrel. Rotation of the stem relative to the barrel is prevented by the pin 67 (see Fig. 2) which passes through the elongated slot and has its ends lodged in opposite portions of the barrel's wall. Axial movement of stem 65 in either direction relative to the barrel is effected by rotation of the knob 68 (see Figs. 2 and 3) which is rotatably mounted in usual fashion, not shown, in the barrel. As the knob is turned in one direction, stem 65 moves out of the barrel and, as the knob is turned in the opposite direction, the stem moves into the barrel. The type of construction here involved is well known, so no further explanation is necessary.

Secured to stem 65 in any convenient manner (not shown), is the block 69 (see Figs. 1 to 3). This block is recessed at 70 (see Fig. 3) to accommodate the smaller block 71 which is connected for pivotal movement thereto by means of the pin 72 (see Fig. 2). Connected to smaller block 71, as by the screw 73, is resilient finger 50, earlier mentioned (see Fig. 3). As there shown this finger extends an appreciable distance away from the smaller block. Because of the earlier mentioned adjustability of bar 51, arm 52, barrel 53, and stem 65, this finger can be conveniently positioned in three dimensions with reference to the cutting tool to serve as a means of preventing rotation of the cutting tool in one direction (i. e. counterclockwise in Fig. 3 in the present instance), while it is being ground by the rapidly revolving abrasive wheel; yet allowing the cutting tool to be intermittently rotated in the opposite direction (i. e. clockwise in Fig. 3, in the present instance), so that the tool can be rotatably indexed one tooth at a time in a clockwise direction (as viewed in Fig. 3). In order to facilitate indexing of the cutting tool, the spring 75 (see Fig. 1) is positioned in any convenient manner (not shown) between blocks 69 and 71. This spring tends constantly to pivot smaller block 71 about pin 72 so that the free end of resilient finger is urged against the cutting tool.

Preparation for use

Having described the essential details of the various components of my fixture, one suggested procedure to be followed in preparing the fixture for use in grinding one form of angular type circular cutting tool, represented solely for illustrative purposes in the drawings, will now be explained. It is to be understood, however, that this procedure may be altered depending upon the form and type of the particular cutting tool to be ground. As earlier mentioned, it is believed that an explanation relative to the illustrated cutting tool will be sufficient to include the full scope of my invention, and that the procedures to be followed in preparing the fixture for use in grinding other different forms and types of circular tools will be obvious and therefore not warrant further comment.

Assuming that the two portions of each of the tool's multiple cutting edges are inclined toward each other so as to include an angle of sixty degrees (60°) (see Fig. 1), and that each of the two portions of each cutting edge is inclined at the same angle (e. g. sixty degrees) relative to the cutting tool's axis, the first step is to pivot yoke 11 into the proper position relative to base plate 10 so as to place the axis of mandrel 28, and therefore the coincident axis of cutting tool 29, in proper angular relationship with the axis of abrasive wheel 23. In the present instance, this angle will be sixty degrees (see Fig. 1). By employing usual machine shop procedure, in conjunction with adjusting screw 47, this angular relationship between the axis of the cutting tool and the axis of the abrasive wheel is easily set.

It will be evident from Fig. 1 that so far I have provided for grinding only one of the two portions of each cutting edge. So, in order to provide for grinding the remaining portion of each cutting edge, I must provide for allowing yoke 11 to be pivoted relative to angular base plate 10 into the position represented partially by broken line in Fig. 1. This will allow the axis of the mandrel, and therefore the axis of the cuting tool mounted thereon, to be inclined in the proper angular relationship relative to the abrasive wheel's axis so that all of the other portions of the tool's cutting edges may be ground. In the present instance, this angle is also sixty degrees, since the two portions of each cutting edge are inclined at a substantially equal angle (i. e. sixty degrees—60°) to the tool's axis. Therefore, again employing usual shop procedure, in conjunction with adjusting screw 48, I provide for positioning the yoke so that the remaining portions of the tool's cutting edges may be ground. In order to maximize the amount of the yoke's pivotal movement relative to the base plate, that plate is provided with the clearance recess 76 (see Fig. 3) and with the clearance recess 77 (see Fig. 1) both of which are shown in leg 15. After that, the yoke is returned to the position shown in solid line in Fig. 1, and screw 36, preferably, is tightened.

After the adjusting screws 47 and 48 have been positioned so as to allow the axis of the mandrel, and therefore the axis of the cutting tool, to assume the desired angular relationship relative to the abrasive wheel's axis when the yoke abuts the respective adjusting screw, mandrel 28 and the tool mounted thereon are rotated so as to place a portion of one of the edges 33 to be ground substantially parallel with the table's top surface (see Fig. 3). When that condition exists, that portion of the cutting edge will also be parallel to the abrasive wheel's axis (see Fig. 1) and therefore be in position to be ground, but the corresponding portions of all the other cutting edges will not be in position for grinding (also see Fig. 3). For convenience of description that portion of the cutting edge positioned parallel to the table and parallel to the wheel's axis will be referred to by the reference character 33a in that figure and will be called the first cutting edge portion to be ground.

In order to hold this portion of the cutting edge, and likewise the corresponding portions of the other cutting edges later to be ground, in position during the grinding operation, finger 50 is positioned at any convenient place between adjacent teeth on the tool (see Fig. 3). This finger acts as a pawl with reference to the tool e. g. the finger will prevent the tool from being rotated in one direction, counterclockwise (as viewed in Fig. 3) in the present instance, by contact with the abrasive wheel as it is later rotated in a clockwise direction (as viewed in Fig. 2); but will allow rotation of the tool in an opposite direction, clockwise (as viewed in Fig. 3) in the present instance, in order that the tool may later be rotatably indexed for the purpose of grinding succeeding cutting edge portions one at a time. As earlier mentioned, the position of the finger is adjustable in three dimensions because of the adjustability of bar 51, arm 52, barrel 53, and stem 65; therefore, positioning of the finger is greatly facilitated.

After yoke 11 is positioned (as and for the purpose explained), work table 19 and abrasive wheel carrier (not shown) are adjusted, by means (also not shown) usually provided for that purpose, so that the axis of abrasive wheel 23 lies in an imaginary plane parallel to the table, but somewhat about a similar plane passing through the cutting tool's axis (see Fig. 3). This, of course, is usual shop procedure which results in the generation of the desired rake angle, or back clearance, on each portion of all cutting edges as they are ground. As a final step, table 19 is adjustably positioned, by means (not shown) usually provided for the purpose, in a direction across Fig. 1 (i. e. from side to side of the drawing sheet) so that, when the grinding operation is actually performed, the desired amount of stock will be removed from the cutting edge.

*Operation*

Having presented the essential details of the various components of my novel fixture and a suggested procedure to be followed in preparing the fixture for use in grinding one form of angular type circular cutting tool, the actual grinding operation can now be described.

By means (not shown) forming part of the grinding machine, abrasive wheel 23 is caused to rotate about its axis in clockwise direction (as viewed in Fig. 2).

While normally tending to rotate mandrel 28 about its axis in a counterclockwise direction (as viewed in Fig. 3), thereby urging the cutting tool against finger 50, table 19 is moved toward the abrasive wheel in a direction parallel to the wheel's axis. This movement of the table, caused by operation of the grinding machine's mechanism (not shown) carries the cutting tool held in the fixture attached to the table toward the abrasive wheel so that one portion (i. e. that portion earlier referred to by the reference number 33a) of one of the tool's multiple cutting edges will be ground by the peripheral edge 23a of the abrasive wheel.

As the grinding is taking place, yoke 11 is urged to rotate about screw 36 in a counterclockwise direction (as viewed in Fig. 1) relative to angular base plate 10 so as to bear against adjusting screw 47, and the cutting tool 29 is urged to rotate about its axis in a counterclockwise direction (as viewed in Fig. 3), against finger 50. These tendencies to rotate, naturally, result from the action of the rotating abrasive wheel on the cutting tool, but are prevented from occurring by the adjusting screw and the finger, respectively. After the table has been moved sufficiently far (not shown) to carry all of the cutting edge's portion 33a past the abrasive wheel, the table's direction of travel is reversed, thus causing the table and the cutting tool in the fixture thereon to move back toward the initial position.

After the initial position of the table is resumed, movement of the table is stopped and the cutting tool is rotatably indexed one tooth in a clockwise direction (as viewed in Fig. 3) so as to bring another tooth into parallelism with the work table and with the abrasive wheel's axis (i. e., into position to be ground). This indexing is accomplished by manually, or otherwise, rotating mandrel 28 upon which the cutting tool is mounted. As the tool is being rotated the finger, being resilient and being attached to the resiliently mounted block 71, clicks from one tooth to the other making it easy for the machine operation to detect when the tool has been properly indexed.

After the tool has been indexed, the table is again moved toward the abrasive wheel, thereby carrying the cutting tool into contact with the abrasive wheel so that the corresponding portion of a second edge is ground. After that, the table is caused to move back to the initial position, the cutting tool is again rotatably indexed one tooth in a clockwise direction (as viewed in Fig. 3), and the table is again moved toward the abrasive wheel so that the corresponding portion of a third cutting edge is ground. These indexing and grinding operations are repeated for each tooth until all the cutting edge portions on one side of the tool have been ground. In order to grind the other portions 34 of the tool's cutting edges, one at a time, it will be obvious to those skilled in the art that one of two alternative procedures may be employed. In the first alternate procedure, yoke 11 can remain at the angle previously set, the position of mandrel 28 reversed end for end, then the position of resilient finger 50 changed to a new convenient position (not shown) substantially diametrically across the cutter so as to serve the same purposes earlier mentioned. In the second alternate procedure, screw 36 is loosened, and the yoke is rotated in a clockwise direction relative to base plate 10 into the position, partially shown by broken line in Fig. 1, against adjusting screw 48, the diametrically opposite side of the abrasive wheel is used, and the direction of the abrasive wheel's rotation is reversed. This repositioning of the yoke, as earlier mentioned places the axis of the mandrel and therefore the axis of the cutting tool, in proper angular relationship relative to the axis of the abrasive wheel so that all of the portions 34 of the cutting edges can be ground. With reference to the second alternate procedure, it will be obvious that the position of the fixture will have to be shifted toward the reader's left (in Figs. 1 and 2) relative to the abrasive wheel. This, of course, may be accomplished by moving the table in that direction while the fixture remains stationary thereon, or by loosening nut 21 and moving the fixture while the table remains stationary.

The procedure to be followed in performing the actual grinding operation on portions 34 of the cutting edges will be obvious to those skilled in the art, and, for that reason, requires no further explanation.

From the foregoing it is apparent that I have simplified the procedure for grinding circular cutting tools; that I have eliminated the necessity for expensive, special purpose grinding machines for grinding such cutting tools; that I have eliminated the need for highly skilled operators to perform the grinding operation; and that I have provided a fixture, attachable to the work table of a simple, comparatively inexpensive grinding machine for grinding circular cutting tools.

Numerous variations and modifications of my invention are feasible without departing from its original spirit and scope. For that reason, I do not want to be limited in patent coverage to the comparatively narrow confines inherent in the embodiment here represented for illustration purposes, but rather only by the metes and bounds of the appended claim.

I claim:

The combination, in a fixture useful in connection with grinding the cutting edges of a circular tool with the aid of an abrasive wheel, of: an angular base plate adapted for mounting on the table of a grinding machine; a yoke on said angular base plate and adjustably rotatable relative thereto upon an axis substantially perpendicular to the abrasive wheel's axis; spaced, coaxial centers in said yoke substantially perpendicular to said yoke's axis of rotation; a mandrel upon which the circular tool to be ground is mounted, said mandrel being supported between said centers and being selectively rotatable upon an axis substantially perpendicular to said yoke's axis of rotation; a yoke positioning bar on said angular base plate; studs rotatably carried by said yoke positioning bar; adjusting screws in said studs for limiting the rotation of said yoke relative to said angular base plate; a bar in said yoke and extending therefrom with the bar's axis substantially parallel with said yoke's axis of rotation, said bar being rotatably and axially adjustable relative to said yoke; an arm in said bar and extending therefrom with the arm's axis substantially perpendicular to said bar's axis, said arm being rotatably and axially adjustable relative to said bar; a barrel in said arm and extending therefrom with the barrel's axis substantially perpendicular to said arm's axis, said barrel being rotatably and axially adjustable relative to said arm; a stem coaxially mounted in said barrel and axially slidable with reference thereto; knob-means for effecting axial movement of said stem with reference to said arm; a first block attached to said stem; a second block attached to said first block for pivotal movement relative thereto upon an axis parallel to said arm's axis; a resilient finger attached to said second block and extending therefrom, said resilient finger being positionable in three dimensions so as to bear against the cutting tool to prevent rotation thereof in one direction, but to allow rotation thereof in the opposite direction; and resilient means between said first and second blocks tending constantly to urge said resilient finger against the cutting tool; whereby the tool's cutting edges can be ground by moving the table so as to carry the tool past the abrasive wheel and by rotatably indexing the cutting tool.

References Cited in the file of this patent

UNITED STATES PATENTS

| | | |
|---|---|---|
| 1,694,074 | Martone | Dec. 4, 1928 |
| 1,721,309 | Miller | July 16, 1929 |
| 1,897,035 | Anderson | Feb. 14, 1933 |
| 1,981,445 | Aker | Nov. 20, 1934 |
| 2,349,324 | Wiedmann | May 23, 1944 |
| 2,396,281 | Noble et al. | Mar. 12, 1946 |
| 2,429,250 | Wiken et al. | Oct. 21, 1947 |